UNITED STATES PATENT OFFICE.

FREDERICK W. GOESSLING, OF JERSEY CITY, NEW JERSEY.

IMPROVED PROCESS FOR MAKING SIRUP FROM INDIAN CORN OR OTHER GRAIN.

Specification forming part of Letters Patent No. 49,751, dated September 5, 1865.

*To all whom it may concern:*

Be it known that I, FREDERICK W. GOESSLING, now of Jersey City, in the county of Hudson and State of New Jersey, have invented a new and Improved Method or Process of Manufacturing a Cane-Like Sirup from Indian Corn or Maize, which method or process is also applicable to all grains or cereals which contain amylum; and I do hereby declare that the following is a full and exact description thereof, to enable others skilled in the art to which it belongs to manufacture sirup according to the principles of my said invention and improvement.

*First degree.*—In the first place I take about three thousand pounds (3,000 lbs.) of Indian corn or maize (or other cereals containing amylum) and soak it in a suitable tank or vat in a caustic-alkali liquid of about 1½° specific gravity, according to Baumé's alkalimeter, or about one week. Then I take this soaked corn or grain and crush it in suitable mills or rollers, and then sift this crushed mass of grain or maize in suitable sieves, and the milky substance which passes through the sieves I put into other tank or tanks and wash it by agitation in a weak alkaline water, and then allow it to settle, and then draw off the top liquid, and then wash it again in pure soft water, and then draw off the top liquid, leaving the milky mass at the bottom of the tank or vat. This milky mass is not commercial starch. It will and must have an alkali taste only sufficient to turn red litmus-paper blue. This constitutes the first degree or first step in my process.

*Second degree.*—I have now prepared and ready for use another suitable tank or vat in which there is placed a lead pipe running back and forth over the bottom of the tank, or in the form of a coil, one end of which lead pipe is connected with an iron pipe outside of the tank, and which iron pipe is connected with a steam-boiler, and the other end of the lead pipe is carried up out of the tank and opens into a barrel outside. Suitable stop-cocks are placed in this lead pipe to regulate and control the passage of steam through it. Into this tank I put about two hundred pounds (200 lbs.) of pure soft water and about twenty-four pounds (24 lbs.) of sulphuric acid. Then I pass steam through this lead pipe, causing the acid-water to boil. Then I mix with the milky substance (described in the first degree of my process) so much pure soft water as will reduce it to the consistency of thin sirup. Then I pass this substance into the boiling acid-water above mentioned so slowly and gradually as will not stop the boiling, and after it is all in I keep it slowly to the boiling-point for about six hours. Then I shut off the steam and add to the boiled massed about ten pounds (10 lbs.) of fine pulverized animal (or lichen) carbon or equivalent, (animal carbon being preferred,) and then add very gradually about twenty pounds of fine pulverized carbonate of lime. (This may be added dry or mixed with water.) Then add about twenty-five per cent. of dextrine sirup or other kind of uncrystallized sirup, and then mix therewith about two pounds of terra-alba or gypsum and boil the whole mass for about five minutes. Then I put in about ten pounds (10 lbs.) more of the above carbonate of lime, which will thoroughly neutralize the whole mass. After the neutralization as aforesaid, I put into the mass about twenty pounds (20 lbs.) of animal-carbon or equivalent, and then boil the whole mass again for about five minutes, and then filter it through cloth filters, which liquid has by such treatment become a cane-like sugar-liquid. Then I put this sugar-liquid into suitable tanks or vats having leaden pipes, as aforesaid, and mix therewith about one per cent. of prepared carbonate of quicklime (such as is found when caustic alkali is manufactured) and about two per cent. of bullock's blood, and then turn on steam and heat the mass up gradually to the boiling-point. During the heating all of the impure stuff rises to the top and is skimmed off, and the sugar-liquid is then filtered through coarsely-powdered animal-charcoal. Then I put the filtered sugar-liquid into a vacuum and boil it down to about 40° specific gravity according to B. Pike's saccharometer. It is then removed and put into a proper reservoir or receiver, where it is allowed to cool, and when cold the process is complete, and produces (including the twenty-five per cent. of dextrine or other uncrystallized sirup above mentioned as being added to it) from four and a half to five and a half gallons of good merchantable cane-like sirup from one bushel of corn or maize.

What I claim as of my invention, and desire to secure by Letters Patent, is—

1. The method or process of making sirup from Indian corn or maize and other grains containing amylaceous matter, herein described, in each or either step or degree thereof, substantially as set forth.

2. A cane-like sirup produced from Indian corn or maize or other cereals containing amylaceous matter, as a new product of manufacture, substantially as set forth.

FREDERICK W. GOESSLING.

Witnesses:
   E. B. FORBUSH,
   W. E. JILLSON.